United States Patent [19]
Smith

[11] 4,281,444
[45] Aug. 4, 1981

[54] WIRE STRIPPER
[75] Inventor: William G. Smith, St. Charles, Ill.
[73] Assignee: Belden Corporation, Geneva, Ill.
[21] Appl. No.: 63,846
[22] Filed: Aug. 6, 1979
[51] Int. Cl.³ .............................................. H02G 1/12
[52] U.S. Cl. ................................ 29/426.5; 29/403.1; 81/9.51; 225/99
[58] Field of Search ............. 81/9.51; 29/426.1, 426.3, 29/426.5, 426.6, 403.1; 83/177, 53; 225/99, 98, 2, 3; 134/9

[56]  References Cited
U.S. PATENT DOCUMENTS
2,425,123  8/1947  Quayle ..................................... 225/99
3,985,848  10/1976  Frische ..................................... 83/177

Primary Examiner—Nicholas P. Godici
Assistant Examiner—Roscoe V. Parker
Attorney, Agent, or Firm—Fitch, Even, Tabin, Flaannery & Welsh

[57] ABSTRACT

A device and method are described for stripping the outer jacket from the inner core of an electrical cable or the like. The device comprises means for generating a high-pressure jet of fluid, means for directing the jet along the length of the electric cable thereby cutting a score mark along the length of the outer jacket, and means for separating the inner core from the outer jacket along the score mark.

21 Claims, 6 Drawing Figures

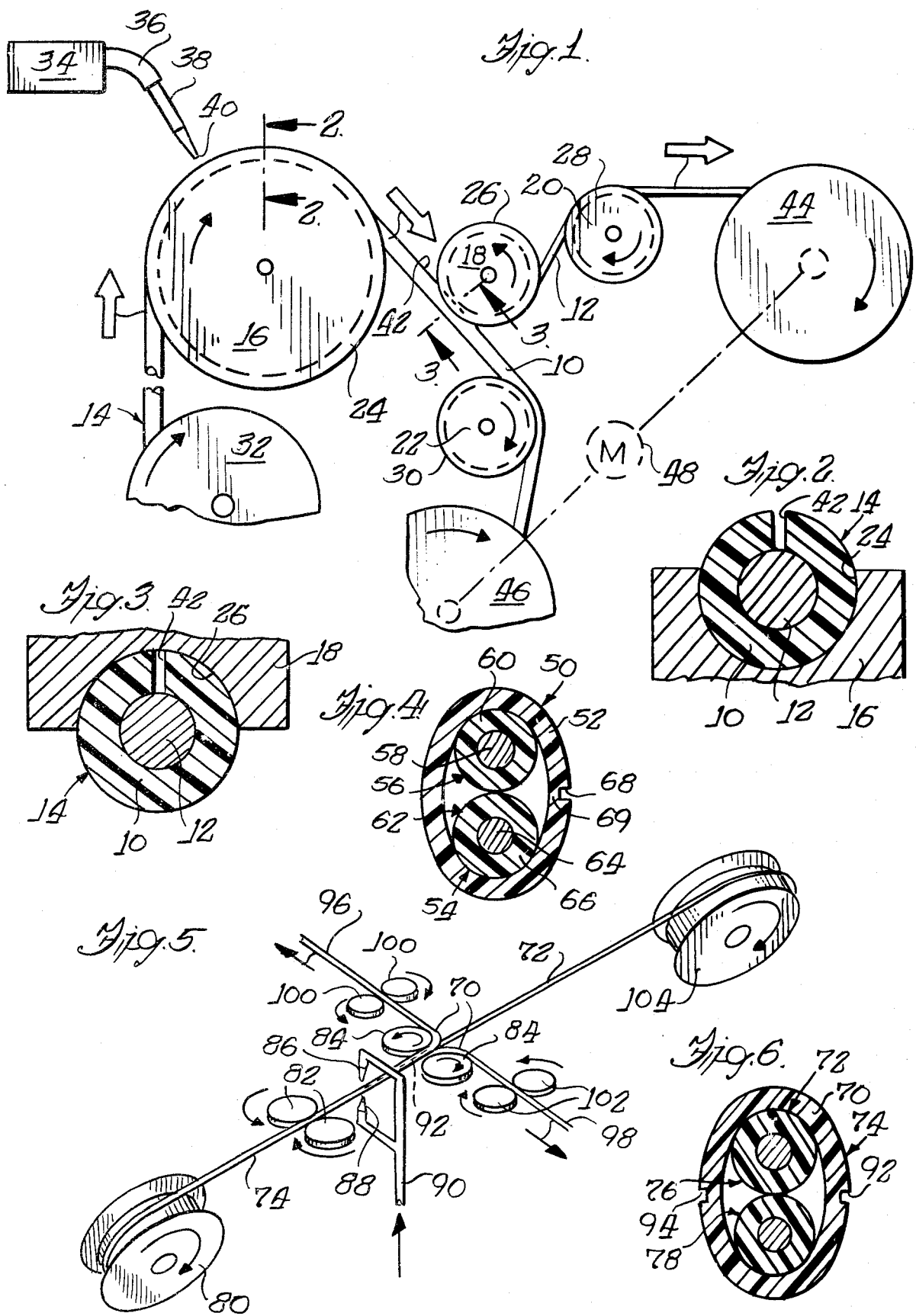

WIRE STRIPPER

This invention relates to a device and method for stripping the outer jacket from the inner core of an electric cable or the like. More particularly, the invention concerns the use of a high-pressure jet of fluid as a cutting instrumentality which allows the outer jacket to be separated from the inner core of the electric cable without damage to the inner core.

It is desirable to separate and salvage the inner core and outer jacket of long lengths of electrical cables which have been damaged or rejected for failure to meet quality control standards during manufacture or the like. A technique used for stripping the outer jacket from the inner core of such cable involves cutting a score mark along the length of the outer jacket and then separating the inner core from the outer jacket along the score mark.

Several techniques have been developed for scoring the outer jacket which include the use of instrumentalities such as cutting knives and lasers. However, these techniques have several drawbacks. Utilizing cutting knives, the process is very time-consuming and requires frequent maintenance since the cutting knives quickly become dull. Further, the cutting knives tend to nick the material beneath the outer jacket and thereby damage it. Systems which utilize lasers are extremely expensive and also have a tendency to cut too deeply and damage material beneath the outer jacket.

Accordingly, it is an object of the present invention to provide an improved device and method for stripping the outer jacket from the inner core of an electric cable.

Another object of the present invention is to provide an improved device and method of the type described for stripping the outer jacket from the inner core of an electric cable without damaging the inner core.

Still another object of the present invention is to provide an improved device and method of the type described which is low in cost and requires little maintenance.

Other objects of the present invention in addition to those set forth above will become apparent to those skilled in the art from the following description, taken in connection with the accompanying drawings wherein:

FIG. 1 is a sectional view of a device constructed in accordance with the invention;

FIG. 2 is a sectional view taken generally along the line 2—2 of FIG. 1;

FIG. 3 is a sectional view taken generally along the line 3—3 of FIG. 1;

FIG. 4 is a sectional view of an electric cable which has been scored with the device of the present invention;

FIG. 5 is another embodiment of a device constructed in accordance with the present invention; and FIG. 6 is a sectional view of an electric cable which has been scored with the device of FIG. 5.

The present invention is directed to an improved device and method for stripping the outer jacket from the inner core of an electric cable. Broadly stated, the device of the present invention comprises means for generating a high-pressure jet of fluid, means for directing the jet along the length of the electric cable thereby cutting a score mark along the length of the outer jacket, and means for separating the inner core from the outer jacket along the score mark.

Referring more particularly to the drawings, and initially to FIGS. 1 through 3, the device of the present invention is shown separating an outer layer of insulation 10 from an inner conductor 12 of an insulated wire 14. The device of the present invention comprises a wire transport system which includes coplanar disc-shaped idlers 16, 18, 20, and 22 which are freely rotatable about parallel axis and which have outer slotted edges 24, 26, 28, and 30, respectively. The unstripped wire 14 is originally wound around a reel 32 which is also rotatable about an axis parallel to the axis of the idlers and located below the idler 16. From the supply reel 32, the cable 14 rides on the top of the idler 16 within the slot 24 in a clockwise direction and then rides on the bottom of the idler 18 within the slot 26 in a counterclockwise direction.

In keeping with the present invention, the means for generating a high-pressure jet of fluid comprises a high-pressure supply of water 34 connected by a hose 36 to a nozzle 38 which is located near the top of the idler 16 centered directly over the wire 14. An orifice 40 in the nozzle 38 is located close to the outer surface of the wire 14 and positioned to direct a continuous needle-like high-pressure jet of water perpendicular to the axis of the wire 14. It is noted that the water could be replaced with a water-polymer solution. The orifice 40 is located close to the surface of the wire to insure that the energy of the jet of water is sufficient to cut through at least a substantial portion of the thickness of the insulation 10 to the inner conductor 12. As the wire 14 moves past the nozzle 38, a score mark 42 is cut into the insulation 10 along the length of the wire 14 (see FIG. 2). The score mark 42 is deep enough to penetrate completely the insulation 10 without damaging the inner conductor 12. Sufficient tension is kept on the wire 14 to ensure that the distance of the orifice 40 from the outer surface of the wire 14 will be approximately the same throughout the entire length of the wire 14.

In keeping with the present invention, the inner conductor 12 is separated from the insulation 10 in the following manner. As the wire 14 comes in contact with the bottom of the slotted edge 26 of the idler 18, the score mark 42 is located near the center of the slotted edge 26 (see FIG. 3). At this point, the inner conductor 12 and the insulation 10 separate. The inner conductor 12 extends up and rides on the top of the idler 20 in the slotted edge 28 in a clockwise direction, and on to a take-up reel 44. The insulation 10 extends down and rides on the top of the idler 22 in the slotted edge 30 and on to a take-up reel 46. The idler 20 is located sufficiently above the idler 22 so that the inner conductor 12 is pulled from the insulation 10 along the score mark 42.

The necessary pull or tension to carry wire 14 tautly along the reels and separate the inner conductor 12 from the insulation 10 is provided by the take-up reels 44 and 46 which are both driven by a motor 48 in a clockwise direction.

There are a number of variables that will affect the performance of the system, such as: water pressure, size of nozzle, configuration of nozzle, distance of nozzle from wire, and wire speed. All of these variables are adjusted to ensure that a score mark of sufficient depth is cut into the insulation 10 without injuring the inner conductor 12, and also to maximize the speed with which the wire 14 is run through the device of the present invention.

It is noted that there is a distinct advantage in using a high-pressure jet of fluid instead of instrumentalities such as knives and lasers to cut a score mark through the outer layer of insulation along the length of an insulated wire. Both knives and lasers can cut or nick the inner conductor thereby destroying its salvage value. On the other hand, although a high-pressure jet of water can readily cut through most nonmetallic materials, such as neoprene rubber, polyolefins, polyvinyl chloride, and other materials from which the layer of insulation of an insulated wire is fabricated, it has little effect on metallic materials such as the materials from which the inner conductor of an insulated wire is fabricated. Therefore the device of the invention which utilizes a high-pressure water jet to cut a score mark along the length of the layer of insulation can be operated at an extremely fast rate without damaging the inner conductor.

It is noted that the device of the present invention can also be utilized to strip the outer jacket from cables having inner cores consisting of various components without damaging the inner cores. For example, the device of the present invention can be utilized to strip the outer jacket from a cable having an inner core consisting of one or more insulated wires without damaging the insulated wires, whereby the inner wires can be salvaged and reused.

FIG. 4 shows a cross-sectional view of a two-conductor unshielded cable 50 having an outer jacket 52 and an inner core 54 comprising a pair of insulated wires. The outer jacket 52 can be fabricated from various materials such as rubber, plastic, or vinyl. The inner core 54 includes an insulated wire 56 having an inner conductor 58 and an outer layer of insulation 60, and an insulated wire 62 having an inner conductor 64 and an outer layer of insulation 66. The device of the present invention can be used to separate the wires 56 and 62 from the outer jacket 52 without damaging the insulation 60 and 66. To this effect, the device of the present invention is used to cut a score mark 68 along the length of the outer jacket 52 which does not completely penetrate the outer jacket 52. The parameters of the device of the invention are regulated to ensure that the score mark 68 penetrates only about 70-90 percent through the outer jacket 52.

By not completely penetrating through the outer jacket 52, it is ensured that the insulation 60 and 66 will not be damaged so that the wires 56 and 62 can be salvaged and therefore reused. The depth of the score mark 68 is deep enough so that the inner core 54 can be pulled from the outer jacket 52 mechanically thereby breaking through a remaining portion 69 along the score mark 68.

It is noted that problems arise when other instrumentalities such as knives are used to cut a score mark along the length of a cable without penetrating through the outer jacket. Due to imperfection in the wire transport system and nonuniformity of the thickness of the cable along its length, the relative distance from the top of the cable to the cutting edge of the cutting knife varies as the cable moves past the knife thereby creating a probability that the knife will cut too deeply through the outer jacket, possibly damaging the inner core and thereby destroying it. This problem becomes more acute for cables having outer jackets which are not cylindrical in shape, for example, a cable comprising a pair of twisted wires encased in a flexible outer jacket which molds to the general contour of the twisted pair of wires.

On the other hand, the cutting power of a jet of fluid is relatively constant for distances close to the orifice of the nozzle. There can be small variations in the distance separating the nozzle and the outer surface of the cable that do not affect the depth of the cut, and the variation that can be experienced without any significant loss of effectiveness or damage is much greater than that which can be tolerated with mechanical cutting knives. Thus, the cutting power and therefore the depth of the cut will be relatively constant irrespective of nonuniformities in the cable and imperfections in the transport system which vary the distance between the orifice of the nozzle and the surface of the cable as the cable passes under the nozzle. By carefully regulating the power of the jet of fluid and the speed of the cable past the nozzle, the depth of the cut can be accurately controlled to prevent the jet of fluid from cutting through the outer jacket and thereby possibly damaging the inner core and destroying its salvage value.

During operation of apparatus embodying the present invention, a two-conductor 19 gauge unshielded cable having a nominal outer diameter of 0.162 inch, with a vinyl outer jacket of 0.025 inch thickness was subjected to a high-pressure jet of water at 15,000 psi. The water was emitted in a needle-like stream from a continuous flow nozzle having a round orifice with an inside diameter of 0.005 inch. The cutting speed was 50 feet per minute with the orifice located about 0.25 inch from the surface of the cable.

In keeping with the present invention, another embodiment is shown in FIG. 5 separating an outer jacket 70 from an inner core 72 of a two-conductor unshielded cable 74. The cable 74 is similar in construction to the cable 50 shown in FIG. 4, with the inner core 72 comprising a pair of insulated wires 76 and 78. The device illustrated in FIG. 5 removes the outer jacket 70 from the inner core 72 by scoring the outer jacket 70 along its length on opposite sides and then pulling the outer jacket 70 apart along the score marks.

Referring to FIG. 5 cable 74 is shown to originate from a supply reel 80 and it travels through two pairs of guide rollers 82 and 84 so that the cable 74 is directed between nozzles 86 and 88 which are both similar in construction to the nozzle 38 shown in FIG. 1. The nozzles 86 and 88 are each connected by a hose 90 to a high-pressure supply of water (not shown) and are both positioned close to the surface of the cable 74 so that each directs a continuous needle-like high-pressure jet of water perpendicular to the axis and along one side of the cable 74. As the cable 74 passes under the nozzles 86 and 88 a pair of score marks are cut on opposite sides along the length of the cable. The score marks preferably penetrate the outer jacket 70 approximately 50 percent to insure that they will not penetrate through to the inner core 72. FIG. 6 shows a cross-sectional view of the cable 74 with score marks 92 and 94 cut on opposite sides. As the scored cable 74 passes the pair of guide rollers 84, the outer jacket 70 is pulled apart along the score marks 92 and 94 forming two outer jacket halves 96 and 98. The outer jacket half 96 rides in a stripper capstan 100 and the outer jacket half 98 rides in a stripper capstan 102 and are each wound onto take-up reels not shown in the figures. The inner core 72 separated from the outer jacket 70 is collected on a take-up reel 104.

By scoring the outer jacket on opposite sides rather than on only one side, it is possible to make a shallower cut which further enhances the ability of the device of the present invention to prevent damage to the inner core when the outer jacket is pulled away. Further by pulling the two halves of the outer jacket apart along two score marks rather than pulling the inner core from the outer jacket along one score mark there is less likelihood of damaging the inner core. For example, with this embodiment the device of the present invention can be used to separate the outer jacket from a cable having an inner core wrapped in tissue paper tape without destroying the tape when the outer jacket is separated from the inner core.

In keeping with the present invention, another embodiment can be used to enable the stripping of a selected portion of insulation from the inner conductor of an insulated wire. For this purpose, means can be provided for restraining a portion of the insulated wire which is to have a selective portion of insulation removed. One or more jets of water can be directed about the insulated wire thereby circumferentially cutting the insulation and thus enabling the removal of the selected portion of insulation.

It may therefore be seen that the present invention provides an improved device and method for stripping the outer jacket from the inner core of an electric cable without damaging the inner core and thereby allowing the inner core to be salvaged. The device of the present invention is low in cost, has a high degree of reliability, and operates at a fast speed. There are also several distinct advantages in using a high-pressure jet of fluid instead of other cutting instrumentalities. The device of the present invention is ideally suited for stripping the outer insulation of an insulated wire without damaging the inner conductor because a high-pressure jet of fluid can easily and quickly cut through the outer insulation while having little effect on the inner conductor. Further, the device of the present invention is also ideally suited for stripping the outer jacket from the inner core of an electric cable because the depth of the cut along the length of the cable can be accurately controlled regardless of irregularities in the wire and the wire transport system to prevent the jet of fluid from cutting through the outer jacket and thereby possibly damaging the inner core.

It should be understood that although certain preferred embodiments of the present invention have been illustrated and described, various modifications, alternatives, and equivalents thereof will become apparent to those skilled in the art and, accordingly, the scope of the present invention should be defined only by the appended claims and equivalents thereof.

Various features of the invention are set forth in the following claims.

What is claimed is:

1. A method for stripping the outer jacket from the inner core of a flexible cable comprising:
   generating a jet of fluid of diameter narrow relative to the cable being stripped and under pressure great enough to cut the outer jacket of the cable without damage to the inner core;
   directing the jet of fluid along a portion of the cable so as to cut at least part way through the outer jacket; and
   separating the inner core and the outer jacket along the cut.

2. The method of claim 1 further characterized in that the step of directing the jet of fluid further comprises moving the cable longitudinally relative to the jet of fluid so that the jacket is cut along its length.

3. A method for stripping a flexible outer jacket from the inner core of a flexible cable comprising: generating a concentrated jet of fluid under pressure sufficient to cut the outer jacket; directing the jet of fluid at the cable thereby cutting the outer jacket; and separating the inner core and the outer jacket along the cut.

4. The method of claim 3 wherein the jet of fluid is directed along the length of the cable thereby cutting a score mark along the length of the outer jacket.

5. The method of claim 4 wherein a high-pressure needle-like jet of fluid is generated.

6. The method of claim 5 wherein the jet of fluid is directed along the length of the cable substantially toward the axis of the cable.

7. The method of claim 6 wherein the score mark penetrates through about 70 to 90 percent of the thickness of the outer jacket.

8. The method of claim 7 wherein the score mark penetrates through the outer jacket along the length of the cable.

9. The method of claim 3 wherein a plurality of high-pressure jets of fluid are generated, and wherein the plurality of jets of fluid are directed along the length of the cable thereby cutting a plurality of score marks along the length of the outer jacket.

10. The method of claim 3 wherein two high-pressure jets of fluid are generated, and wherein the two jets of fluid are directed along the length of the cable thereby cutting two score marks along the length of the outer jacket.

11. The method of claim 10 wherein as the two jets of fluid are directed along the length of the cable, each of the jets of fluid is directed substantially toward the axis of the cable and on opposite sides of the cable.

12. The method of claim 9, 10 or 11 wherein the inner core is separated from the outer jacket by pulling the outer jacket apart along the cut.

13. A device for stripping a flexible outer jacket from the inner core of a flexible cable comprising:
   source means for producing a fluid jet, said source means having an orifice through which the fluid jet exits the source means in a stream narrow relative to the diameter of cables to be stripped, said source means including pressure means for driving said fluid jet at pressure great enough to cut at least part way through the outer jacket of a cable;
   guide means for supporting a cable a predetermined distance from the orifice with the cable centered on the orifice to intercept the fluid jet along the center of the cable;
   drive means for moving the cable relative to said orifice at a rate at which the fluid jet cuts at least part way through the outer jacket; and
   separating means for separating the inner core from the outer jacket along the cut.

14. The device of claim 13 further characterized in that said drive means provides for longitudinal movement of the cable over said guide means relative to the orifice means so that the cut is made along the length of the outer jacket.

15. The device of claim 13 wherein at the predetermined distance the diameter of the jet of fluid near the point of impact approximates the diameter of the jet of fluid as it exits the orifice.

16. The device of claim 15 wherein said source means directs the jet of fluid substantially toward the axis of the cable.

17. The device of claim 15 wherein said guide means includes a slot within which the cable rides as its travels past the orifice.

18. The device of claim 15 wherein said source means is capable of generating a jet of fluid at about 15,000 psi, the orifice of said source means has a diameter of about 0.005 inches, and, said guide means supports said cable about 0.25 inches from the orifice.

19. The device of claim 15 wherein said source means has a plurality of orifices for providing a plurality of concentrated jets of fluid directed toward the cable, and wherein said drive means and guide means provide for longitudinal movement of the cable relative to the orifices so as to form a plurality of cuts along the length of the cable.

20. The device of claim 19 further characterized in that said source means has two orifices for providing two jets of fluid directed toward the axis of the cable and on opposite sides of the cable.

21. The device of claim 18 or 19 wherein the separating means separates the inner core form the outer jacket by pulling the outer jacket apart along the cuts.

* * * * *